Aug. 14, 1956 W. C. GRAY 2,758,871
GLASS RUN CHANNELS FOR VEHICLE WINDOWS
Filed April 16, 1954 2 Sheets-Sheet 1
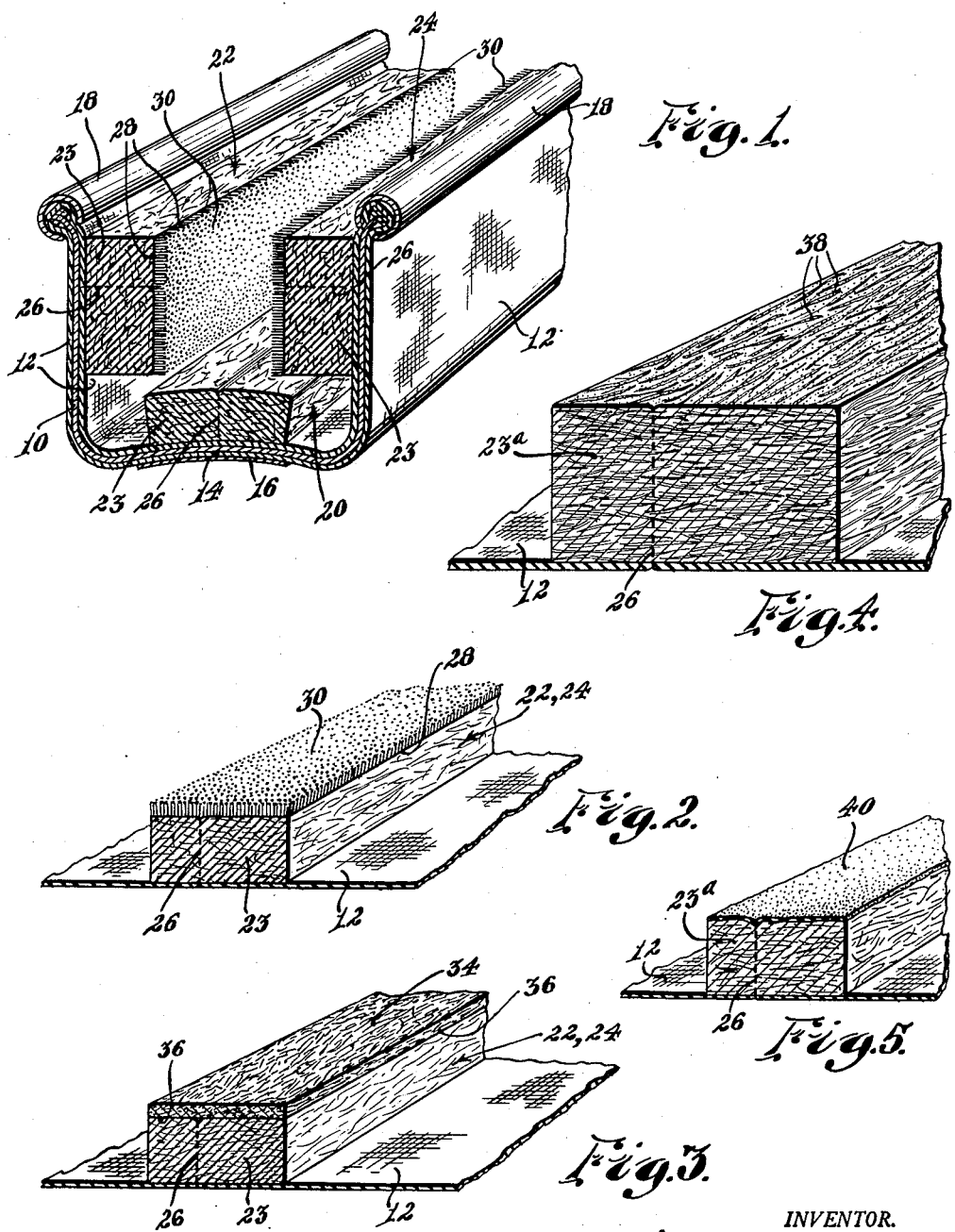
INVENTOR.
William C. Gray United States Patent Office 2,758,871
Patented Aug. 14, 1956

2,758,871

GLASS RUN CHANNELS FOR VEHICLE WINDOWS

William C. Gray, Amesbury, Mass., assignor to The Bailey Company, Incorporated, Amesbury, Mass., a corporation of Massachusetts Application April 16, 1954, Serial No. 423,797

10 Claims. (Cl. 296—44.5)

This invention relates to improvements in glass run channels for the windows of automotive vehicles, and the like. More particularly the invention provides improved resilient glass-engaging means interiorly of such glass run channels whereby the window glass is more readily movable in the channels as compared with the prior comparable channels.

Glass run channels of the general type to which the invention relates ordinarily have a metal core channel on whose side and bottom walls are mounted cushioning strips arranged interiorly of the channel. The cushioning strips may be of felt with the felted fibres directly engaging the glass, or may comprise resilient bodies of pile fabric, or other resilient material, having glass-engaging surfaces of pile or the like.

It has been characteristic of prior glass run cushioning strips that they serve their purposes satisfactorily under relatively dry conditions but clamp the window glass too tightly under moist or wet conditions with the result that excessive friction between the cushioning strips and the glass makes it difficult to move the window glass. When the cushioning strips are wholly or in large part composed of felt, or the like, moisture entering into the felt causes it to swell appreciably and this swelling is to some extent responsible for the prior build-up of excessive friction. However, it has been determined that a very substantial part of the build-up of friction between the cushioning strips and the glass, under moist or wet conditions, is attributable to characteristics of the glass-engaging materials of the prior cushioning strips, in that these prior glass-engaging materials have had relatively high wet coefficients of friction with glass. For example, channel strips made of felt and having surface fibres of the felt engaging the window glass ordinarily will have a dry coefficient of friction with glass of from .12 to .14 when the glass is in motion at a rate of from 4" to 5" per minute and when a pressure of approximately one tenth pound per square inch is maintained between the cushioning strips and the glass. The same felt strips, under wet conditions, may have a wet coefficient of friction with glass of from .40 to .55. The other materials heretofore used as glass-engaging portions for such channel strips have had comparable relatively high wet coefficients of friction with glass.

It is among the objects of the present invention to substantially reduce the heretofore troublesome build-up of friction between window channel cushioning strips and the window glass under moist or wet conditions by providing the cushioning strips with glass-engaging portions which have relatively low coefficients of friction with glass when wet. According to the invention, the body portion of a cushioning strip may be of felt, or other fibrous material, whose coefficient of friction with glass is relatively high when the strip is wet, such as the mentioned wet coefficient of from .40 to .55. That surface of the felt strip which is toward the window glass has applied thereto a material having a substantially lower coefficient of friction with glass when wet, such as one of the available synthetic materials having a wet coefficient of friction with glass of the order of from .15–.25 under conditions similar to those prevailing when the mentioned wet coefficient of the felt was determined.

Another object of the invention is to substantially reduce the build-up of friction between window channel cushioning strips and the window glass when the strips become wet by employing glass-engaging material on the strips whose dry and wet coefficients of friction vary relatively little as compared with the variation between the dry and wet coefficients of friction with glass of commercial varieties of felt as heretofore employed in such cushioning strips.

A further object of the invention is to provide a window channel cushioning strip comprising a main body portion of felt, or the like, having glass-engaging material thereon whose wet coefficient of friction with glass is substantially less than the wet coefficient of friction of the felt with glass, and having the fibres of the felt adjacent said glass-engaging material adhered together and minimizing the effect of swelling of the felt, when wet, in direction toward the window glass.

It is, moreover, my purpose and object generally to improve the effectiveness and efficiency of glass run channels for vehicle windows, and the like, and more especially to eliminate or greatly reduce the prevalent tendency of channel cushioning strips when wet, to bind and frictionally hold a window glass against movement with desired ease.

In the accompanying drawing:

Fig. 1 is a perspective view, partly in cross-section, of a short length of glass run channel embodying features of the invention;

Fig. 2 is a perspective view partly in cross-section, of the fabric sheet which covers the metallic channel core of Fig. 1, with one of the side wall cushioning strips of Fig. 1 stitched thereto;

Fig. 3 is a view similar to Fig. 2 but showing a modified form of cushioning strip;

Fig. 4 is a view generally similar to Figs. 2 and 3, on a larger scale, and showing another modified form of cushioning strip;

Fig. 5 is a view similar to Figs. 2 and 3 showing still another modified form of cushioning strip;

Figure 6:
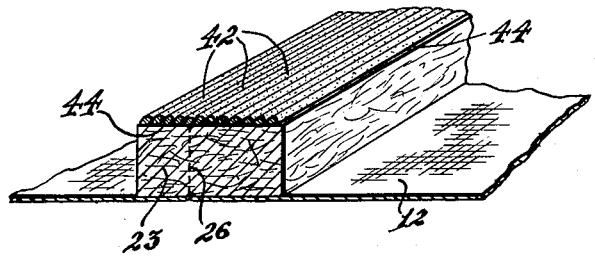
Fig. 6 is a view similar to Figs. 2, 3 and 5 but showing glass-engaging material on the strip in the form of generally parallel linear surface elements.

Referring to the drawing, a conventional variety of metal core channel 10 is represented in Fig. 1 as completely covered by the fabric 12 which may be cemented to the core channel. As shown, the edges of the fabric 12 are butted at 14 exteriorly and centrally of the bottom wall of the core channel with a strip of adhesive tape 16, or the like, covering the butted edges of the fabric 12. However, the metal core channel may be variously covered by the fabric 12 and the butting of edges at 14 and the covering tape 16 are not essential features of the channel structure.

Metal bead strips 18 are shown engaged over the covered edges of the core channel although the glass run channels frequently are employed without such bead strips.

Before the fabric 12 is arranged on the metal core channel 10, it is combined with the cushioning strips 20, 22, 24, as by stitching 26, with the strips extending in general parallelism along the fabric 12 in a predetermined spaced relationship such that, when the fabric is mounted in covering relation to the core channel 10, the similar strips 22, 24 are in the channel for engaging opposite sides of the glass, and strip 20 is centrally on the bottom wall of the channel.

While it is preferred to employ cushioning strips having the rectangular cross-section as herein illustrated, it should be understood that the cushioning strips may, if desired, have other cross-sectional shapes.

According to the invention, however, each of the cushioning strips 20, 22, 24 comprises a resilient body portion 23 of felt, or of a comparable fibrous material, and each of the two oppositely disposed cushioning strips 22, 24, and the cushioning strip 20, if desired, has glass-engaging material on its felt body portion 23 which has a wet coefficient of friction with glass substantially less than the coefficient of friction of wet felt with glass. The glass-engaging material may be variously applied to or combined with the body portion 23 of a cushioning strip, and any of a variety of synthetic materials may be employed as the glass-engaging material.

Commercially available felt as employed for window channel cushioning strips ordinarily has a dry coefficient of friction with glass of from .12 to .14 when the window glass is moving four to five inches per minute with a pressure of one tenth of a pound per square inch maintained between the felt and the moving window glass. However, when the felt channel strips are wet, the coefficient of friction of the wet felt with the glass increases to from .40 to .55 and this substantial build-up of friction makes it objectionably difficult to move the window glass in its channel. Comparable relatively large build-up of friction, under wet conditions, has accompanied use of other conventional cushioning strip materials such as the pile fabric materials which frequently have been employed as the glass-engaging material on strip bodies of felt, or the like.

In connection with the present invention, it has been demonstrated that certain synthetic materials when applied to channel-cushioning strip bodies of felt, or the like, for engaging the window glass, have desirably low coefficients of friction with glass both in the dry and in the wet conditions of these synthetic materials. The commercially available acrylic synthetic materials known as "Dynel," "Orlon," "Acrilan," and "X–51" are one group of synthetic materials having suitably low wet coefficients of friction with glass for use on the cushioning strips of the invention. Also, the commercially available synthetic materials known as "Dacron," "polyethylene," "nylon," "Vinyon" and "Saran" may be used with advantage. Any of these synthetic materials may be applied to the strip body 23 of felt, or the like, by being sprayed or coated as a liquid on the surface fibres of the body 23 at that portion of the body which is toward the window glass, or the synthetic material may be unwoven linear elements adhered to the body 23 in the form of cord, yarn, sliver, tow, roving, or matted fibre web; or the synthetic material may be in the form of a woven fabric, or bonded fabric, or laid fabric, and these synthetic fabrics may or may not have nap or pile or the like for directly engaging the window glass. The applied synthetic material may, when desired, be suitably treated by calendering, heating, or other process, to provide a desired glass-engaging surface.

In the embodiment of the invention illustrated in Figs. 1 and 2, each of the oppositely disposed strip bodies 23 has a coating of moisture-impervious adhesive 28 applied thereto, and the synthetic glass-engaging material is in the form of relatively short fibres 30 densely flocked on the coated surface. The cushioning strip 20 along the bottom of the channel may, if desired, be the same as the flocked strips on the side walls of the channel. The flocked fibres may be of any of the synthetic materials earlier mentioned herein as having a desired low wet coefficient of friction with glass. Fibres of the acrylic group have been found to be desirably effective for the flocking at 30.

When the body strips 23 are of felt, or include fibrous fabric material subject to swelling when wet, it is highly desirable to minimize the effects of any swelling of the body strips. The coatings 28 on the body strips at the sides of the channel of Fig. 1 lock together the adjacent surface fibres of the felt and these locked fibres tend to minimize swelling of the felt body in direction toward the window glass. The coatings 28 also serve, to some extent, as barriers against entrance of moisture into the felt at the flocked portions of the cushioning strips.

Any of a variety of well known rubber base adhesives, or any of various available synthetic resin adhesives, may be used for the coatings 28. Or it may be found desirable, under some conditions, to provide coatings 28 of the same material of which the synthetic flocked fibres 30 are made.

The length and diameter of the flocked fibres 30 may vary considerably in different channels as may be desired. For example, flocked fibres of .030" or .040" length may be employed with the free ends of the fibres engaging the window glass. Or the flocked fibres may have length of the order of .188", in which case the sides, or the sides and ends, of the fibres will engage the glass.

In the modification of Fig. 3, the body strip 23 may be the same as in the strip of Fig. 2 but, instead of flocked fibres at the glass-engaging surface, a relatively thin layer 34 of unwoven fibres is employed in Fig. 3, and is secured to the body strip 23 by adhesive 36 which may be spread as a coating over either the surface of the body strip 23 or the surface of the matted fibre layer 34 or over both of these surfaces. The fibres in layer 34 may be "Dynel" fibres or any of the other previously mentioned fibres having a suitably low coefficient of friction with glass when wet. The adhesive at 36 may be a rubber base or synthetic resin adhesive having properties as described in connection with the coating 28 of the Figs. 1 and 2 embodiment.

Fig. 4 illustrates a modification in which the entire thickness of the strip body 23a is of felt or other comparable fibrous material, and in which only a relatively thin film of material is sprayed on or otherwise applied to the surface fibres of the felt. The sprayed film is represented by stippling at 38 in Fig. 4, and may be of material from which synthetic fibres are made, or of other synthetic material. The film forms around the individual surface fibres and to some extent between them so that the surface continues to have its fibrous nature when engaging a window glass, with the film serving to reduce friction between the strip and the glass.

However, the same liquid material which is sprayed on the surface fibres in Fig. 4, if desired, may be applied in larger quantity to provide a definite coating over the felt surface as represented at 40 in Fig. 5.

In the embodiment of the invention illustrated in Fig. 6, a strip body 23 of felt, or the like, has glass-engaging synthetic material applied thereto in the form of a series of linear elements 42 which should be considered as representative of threads, yarns, cords, and the like, made of the selected synthetic material and secured by adhesive 44 to a surface portion of the fibrous body 23. The elements 42 may be applied as separate elements or they may be bonded together into an unwoven sheet before being applied to the body 23. Obviously, if desired, the synthetic material may be applied as sliver, roving, tow or elements made from fibrous waste particles of the synthetic material, generally in the same manner as the elements 42 are applied in Fig. 6.

Figure 7:
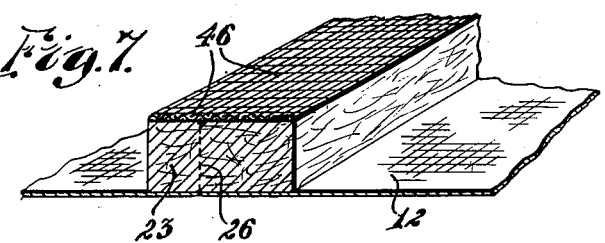
Fig. 7 is a view similar to Fig. 6 but showing glass-engaging material on the strip in the form of a woven sheet.
Figure 8:
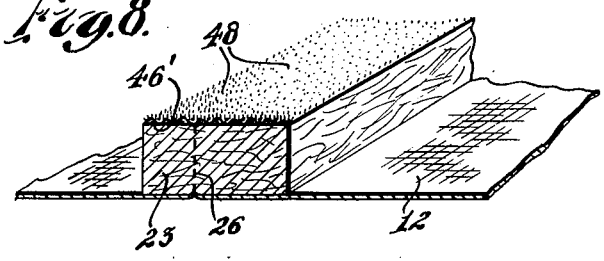
Fig. 8 is a view similar to Fig. 7 but showing glass-engaging material on the strip in the form of a napped woven sheet.

Fig. 7 illustrates a glass-engaging cushioning strip surface in the form of a woven fabric 46 made of one of the mentioned synthetic fibres. Fig. 8 is generally similar to Fig. 7 but represents the synthetic fabric 46' as a napped or pile fabric, or a fabric which is otherwise treated to provide relatively short projecting fibrous elements 48 for directly engaging a window glass.

It is important that each of the channel cushioning strips have a suitably resilient fibrous body 23, of felt or the like, and it is an essential requirement of the invention that at least one side wall cushioning strip shall have glass-engaging synthetic material thereon having a substantially lower wet coefficient of friction with glass than the felt or other fibrous body material of the strip.

While felt is herein illustrated and described as a suitable fibrous material for the channel body strips 23, other suitably stable and resilient fibrous materials may be used for the body strips, or they may be composed of a combination of different fibrous materials. Similarly, combinations of different synthetic materials may be employed for the glass-engaging portions of the channel strips so long as the glass-engaging material has a suitably low wet coefficient of friction with the window glass.

Hence, it is intended that the patent shall cover, by suitable expression in the appended claims, whatever features of patentable novelty exist in the invention disclosed.

I claim as my invention:

1. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, at least one of said strips having a body portion comprising a cushioning mass of resilient fibrous material whose fibres are matted with extent in directions generally parallel with the plane of the window glass, and said body portion having a different material thereon for directly engaging the window glass, the latter said material having a coefficient of friction with glass under the said predetermined wet conditions which is of the order of one half the coefficient of friction with glass of said fibrous body material under the said predetermined wet conditions, and said cushioning body portion providing substantially more than one half of the total thickness of the strip.

2. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, at least one of said cushioning strips comprising a cushioning mass of fibrous material wherein the fibres are matted with extent in directions generally parallel with the plane of the window glass to provide a resilient fibrous body portion of material which, under said predetermined wet conditions, has a wet coefficient of friction with glass substantially greater than .25, and the said body portion having glass-engaging material thereon whose wet coefficient of friction with glass is at most as low as .25 under the said predetermined wet conditions, said body portion providing substantially more than one half of the total thickness of the strip.

3. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, at least one of said cushioning strips comprising a resilient cushioning body portion having substantial thickness for providing substantially more than one half of the total thickness of the strip, said body portion having a coating of moisture impervious adhesive covering a surface portion thereof and, on said coated surface portion, glass-engaging synthetic fibrous material having a wet coefficient of friction with glass, under the said predetermined wet conditions, substantially lower than the wet coefficient of friction with glass of said resilient body portion under the said predetermined wet conditions.

4. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, each said cushioning strip comprising a resilient cushioning body portion having substantial thickness for providing substantially more than one half of the total thickness of the strip, said body portion having a coating of moisture impervious adhesive on one surface portion thereof and, on said coated surface portion, a flocking of glass-engaging synthetic fibrous material having coefficients of friction with glass which vary relatively little with change from said predetermined dry conditions to said predetermined wet conditions, said flocking material having a wet coefficient of friction with glass which is at most as low as .25 under the said predetermined wet conditions.

5. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, at least one of said cushioning strips comprising a resilient fibrous cushioning body portion having substantial thickness for providing substantially more than one half of the total thickness of said strip, said body portion having a coating of moisture impervious adhesive on one surface portion thereof locking surface fibres of said body together, and synthetic fibres relatively densely flocked on said coated surface portion of the fibrous body and secured by said adhesive, said flocked fibres being of material having a wet coefficient of friction with glass, under the said predetermined wet conditions, substantially lower than the wet coefficient of friction with glass of said fibrous body portion under the said predetermined wet conditions.

6. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, each said cushioning strip comprising a resilient body of felt having substantial thickness for providing substantially more than one half of the total thickness of the strip, said felt body having a coating of adhesive covering a surface portion thereof and, on said coated surface portion, a glass-engaging flocking of synthetic fibrous material having a wet coefficient of friction with glass which is substantially less than that of the felt and which is at most .25 under the said predetermined wet conditions.

7. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, at least one of said cushioning strips comprising a resilient fibrous cushioning body portion whose fibres are matted with extent in directions generally parallel with the plane of the window glass, said body portion having a coating of moisture impervious adhesive covering one surface portion thereof and locking together surface fibres of said body, and synthetic fibres relatively densely flocked on said coated surface portion of the fibrous body and secured by said coating adhesive, said flocked fibres being of material having a wet coefficient of friction with glass under the said predetermined wet conditions which approximates one half the wet coefficient of friction with glass of the material of said fibrous body under the said predetermined wet conditions, and said cushioning body portion providing substantially more than one half of the total thickness of the strip.

8. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, at least one of said cushioning strips comprising a resilient body portion of felt having substantial thickness for providing substantially more than one half of the total thickness of the said strip, said felt body portion having a coating of moisture impervious adhesive on one surface portion thereof, and synthetic fibrous material secured to said body portion by the said adhesive and constituting glass-engaging elements whose wet coefficient of friction with glass is at most as low as .25 under the said predetermined wet conditions.

9. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, at least one of said cushioning strips comprising a resilient fibrous body portion having substantial thickness for providing substantially more than one half of the total thickness of the strip, said body portion having glass-engaging synthetic material thereon whose wet coefficient of friction with glass is at most .25 under the said predetermined wet conditions.

10. In a glass run window channel, oppositely disposed cushioning strips interiorly of the channel and adapted to engage a window glass between them with varying degrees of pressure of the strips on the glass which permit relatively easy movement of the glass in the channel under predetermined dry conditions and under predetermined wet conditions, at least one of said cushioning strips comprising a resilient body portion of felt having substantial thickness for providing substantially more than one half of the total thickness of the strip, said felt body portion having synthetic material thereon for directly engaging the window glass, the said glass-engaging synthetic material having a wet coefficient of friction with glass which is substantially less than that of the felt and at most as low as .25 under the said predetermined wet conditions as compared with .55 for felt under comparable conditions.

References Cited in the file of this patent

UNITED STATES PATENTS

| | | |
|---|---|---|
| 1,843,433 | Randall | Feb. 2, 1932 |
| 1,918,444 | Bailey | July 18, 1933 |
| 2,594,717 | Bailey | Apr. 29, 1952 |

FOREIGN PATENTS

| | | |
|---|---|---|
| 616,918 | Great Britain | Jan. 28, 1949 |